United States Patent
Choi et al.

(10) Patent No.: US 12,425,275 B2
(45) Date of Patent: Sep. 23, 2025

(54) HYBRID SOURCE-SERIES TERMINATION DRIVER WITH CONSTANT OUTPUT SWING

(71) Applicant: Samsung Electronics Co., Ltd., Gyeonggi-do (KR)

(72) Inventors: Minsoo Choi, Santa Clara, CA (US); Hiep Pham, Saratoga, CA (US); Chih-Wei Yao, Saratoga, CA (US); Hyojun Kim, Milpitas, CA (US)

(73) Assignee: Samsung Electronics Co., Ltd (KR)

( * ) Notice: Subject to any disclaimer, the term of this patent is extended or adjusted under 35 U.S.C. 154(b) by 86 days.

(21) Appl. No.: 18/401,971

(22) Filed: Jan. 2, 2024

(65) Prior Publication Data

US 2025/0125998 A1   Apr. 17, 2025

Related U.S. Application Data

(60) Provisional application No. 63/590,125, filed on Oct. 13, 2023.

(51) Int. Cl.
   *H04L 25/02* (2006.01)
(52) U.S. Cl.
   CPC ...... *H04L 25/0272* (2013.01); *H04L 25/0278* (2013.01); *H04L 25/0282* (2013.01)
(58) Field of Classification Search
   CPC ............. H04L 25/0272; H04L 25/0278; H04L 25/0282
   See application file for complete search history.

(56) References Cited

U.S. PATENT DOCUMENTS

| | | | |
|---|---|---|---|
| 8,836,381 B2 | 9/2014 | Boecker et al. | |
| 9,455,713 B1 | 9/2016 | Kadkol | |
| 10,257,121 B1 | 4/2019 | Qin et al. | |
| 10,985,759 B2 | 4/2021 | den Besten et al. | |
| 11,031,936 B1 | 6/2021 | Luo et al. | |
| 11,640,367 B1 | 5/2023 | Chen | |
| 2004/0119461 A1* | 6/2004 | Casper | H04L 25/03885 333/18 |
| 2005/0195005 A1* | 9/2005 | Choi | H03K 19/018521 327/170 |
| 2012/0307122 A1* | 12/2012 | Liu | H03F 3/45654 348/332 |

FOREIGN PATENT DOCUMENTS

WO   WO 2022/145640   7/2022

OTHER PUBLICATIONS

Bae, Woorham, "CMOS Inverter as Analog Circuit: An Overview", Journal of Low Power Electronics and Applications, 2019, pp. 15.
(Continued)

*Primary Examiner* — Sung S Ahn
(74) *Attorney, Agent, or Firm* — The Farrell Law Firm, P.C.

(57) ABSTRACT

A wireline transceiver system includes a predriver configured to generate a signal; a source-series termination (SST) driver configured to receive the generated signal; and a replica driver configured to continuously generate bias voltages in real time to modulate current of a push-pull current source of the SST driver based on a voltage of the received signal across a process, voltage, and temperature (PVT) range.

20 Claims, 11 Drawing Sheets

(56) References Cited

OTHER PUBLICATIONS

Guo, Z. et al., "A 112.5Gb/s ADC-DSP-Based PAM-4 Long-Reach Transceiver with >50dB Channel Loss in 5nm FinFET," 2022 IEEE International Solid-State Circuits Conference (ISSCC), San Francisco, CA, USA, 2022, pp. 116-118.

Song, Y. H. et al., "A 6-Gbit/s Hybrid Voltage-Mode Transmitter With Current-Mode Equalization in 90-nm CMOS," IEEE Transactions on Circuits and Systems II: Express Briefs, vol. 59, No. 8, pp. 491-495, Aug. 2012.

Song,, Y. H. et al., "An 8-16 GB/s, 0.65-1.05 pJ/b, Voltage-Mode Transmitter With Analog Impedance Modulation Equalization and Sub-3 ns Power-State Transitioning," IEEE Journal of Solid-State Circuits, vol. 49, No. 11, pp. 2631-2643, Nov. 2014.

\* cited by examiner

HYBRID SOURCE-SERIES TERMINATION DRIVER WITH CONSTANT OUTPUT SWING

CROSS-REFERENCE TO RELATED APPLICATION

This application claims the priority benefit under 35 U.S.C. § 119 (e) of U.S. Provisional Application No. 63/590,125, filed on Oct. 13, 2023, the disclosure of which is incorporated by reference in its entirety as if fully set forth herein.

TECHNICAL FIELD

The disclosure generally relates to electronic devices. More particularly, the subject matter disclosed herein relates to improvements to wireline transceivers.

SUMMARY

In wireline transceiver systems the output resistance of a traditional source-series termination (SST) driver varies under process-voltage-temperature (PVT) conditions. This variation leads to fluctuations in output swing and return loss, ultimately degrading link performance across PVT conditions.

To maintain a desired output swing and comply with return loss constraints, transmitter designs with SST drivers often employ head/foot resistance devices. However, this approach, while somewhat effective, results in larger driver sizes, which can adversely affect the bandwidth. Moreover, some configurations may require additional pins for PVT sensing, adding to the complexity and size of the system.

The present disclosure aims to stabilize the output swing under these varying conditions without compromising other performance metrics like bandwidth and link performance by introducing a push-pull current stage, initially used for equalization purposes.

According to an aspect of the disclosure, a wireline transceiver system includes a predriver configured to generate a signal; an SST driver configured to receive the generated signal; and a replica driver configured to continuously generate bias voltages in real time to modulate current of a push-pull current source of the SST driver based on a voltage of the received signal across a PVT range.

According to another aspect of the disclosure, a method for generating bias voltage in a wireline transceiver system includes generating a signal at a predriver; receiving the generated signal at an SST driver; and continuously generating the bias voltages in real time at a replica driver to modulate current of a push-pull current source of the SST driver based on a voltage of the received signal across a PVT range.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
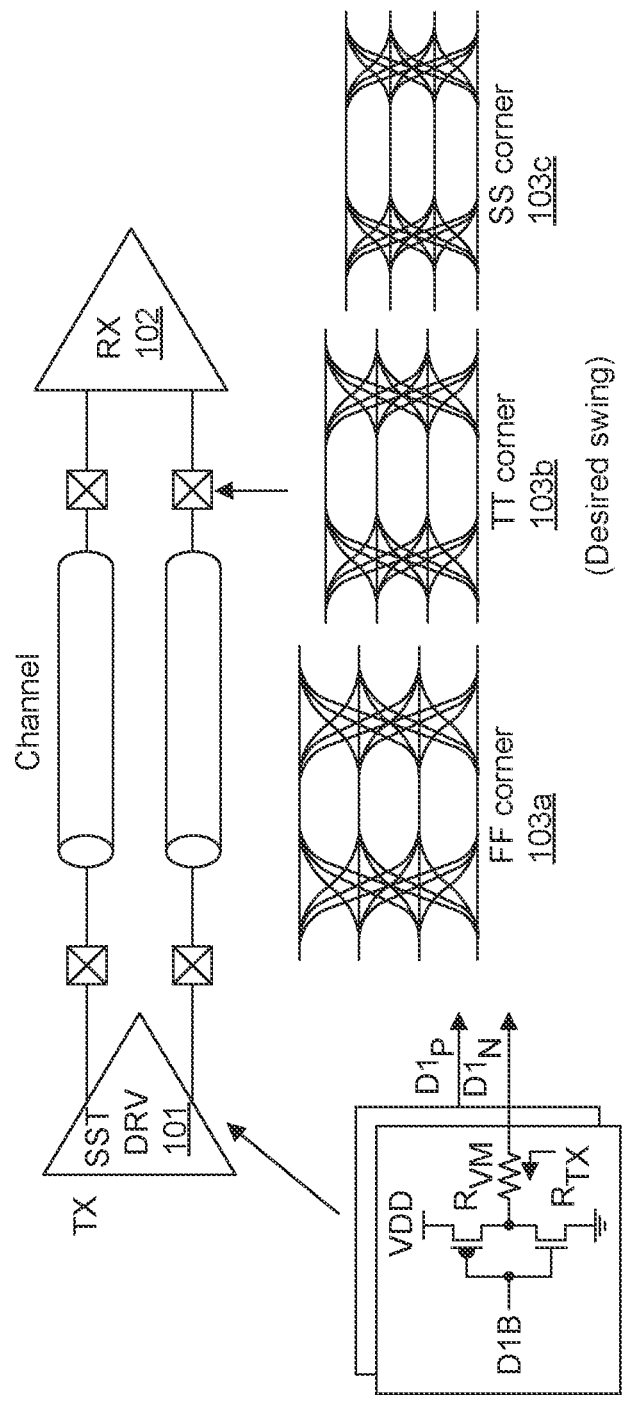
FIG. 1 illustrates a wireline transceiver structure, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The output resistance of SST drivers is subject to variation under different PVT conditions due to the inherent variability in semiconductor manufacturing, operating conditions, and thermal effects. In the manufacturing process, slight deviations in the physical and chemical properties of semiconductor materials can lead to changes in the electrical characteristics of transistors, thus altering the output resistance of the SST drivers. Voltage fluctuations further contribute to this variation as they can affect the voltage drop across the driver and the transistors' performance within the driver circuit. Additionally, temperature changes impact carrier mobility within the semiconductor material, which directly influences the resistance of the transistors in the SST drivers.

These variations in output resistance can cause changes in the output swing, which may be defined as the difference between the high and low voltage levels that the driver can produce. As the output resistance changes, so does the voltage drop across the driver when driving a signal, leading to a corresponding change in the output swing. A higher than expected output resistance would decrease the output swing, whereas a lower resistance would increase it.

In addition, variations in output resistance can lead to return loss violations. An SST driver is designed to match the characteristic impedance of the transmission line it drives to minimize signal reflections. When PVT conditions cause the driver's output resistance to stray from this optimal impedance, the mismatch can result in a greater portion of the signal being reflected back toward the source, measured as return loss. If the return loss exceeds acceptable thresholds, it signifies a violation that can cause signal integrity issues, such as signal degradation or increased error rates, thus impairing the performance of the wireline communication system.

FIG. 1 illustrates a wireline transceiver structure, according to an embodiment.

Referring to FIG. 1, a wireline transceiver structure is illustrated with an SST driver (DRV) 101. The SST driver in FIG. 1 includes a logic gate, labeled D1B. The SST driver is depicted as a transistor with an arrow indicating its direction of current flow, connected to two resistive elements: one to ground, and one to a positive power supply, labeled VDD.

FIG. 1 also illustrates voltage swings at a pin between the channel and the receiver RX 102 in a fast-fast (FF) corner 103a, typical-typical (TT) corner 103b, and slow-slow (SS) corner 103c. FF corner, TT corner, and SS corner are used in semiconductor manufacturing to denote the variability in the fabrication process and its impact on the performance of ICs. The FF corner describes a scenario where both n-channel metal-oxide semiconductor (NMOS) and positive-channel metal oxide semiconductor (PMOS) transistors operate faster than normal due to factors such as higher dopant concentrations or thinner gate oxides, which could lead to quicker switching times but also higher leakage currents. The TT corner represents the standard performance of transistors, serving as the baseline for design and testing. In contrast, the SS corner occurs when both NMOS and PMOS transistor types operate slower than average, which may result in reduced switching speeds and potentially not meeting timing requirements at higher frequencies.

To counteract the variations in output resistance caused by changes in PVT, transmitter designs may incorporate head/foot resistance devices. These devices, while effective in maintaining the required output swing and meeting the return loss constraints, may result in increased driver size, which can negatively impact the bandwidth.

The present disclosure introduces a solution based on the push-pull current stage, which is traditionally utilized for signal equalization, which leverages the push-pull current stage for the active adjustment of the output swing, thereby ensuring consistent performance across PVT variations. This is grounded in the fundamental concept of PVT tracking, which dynamically adjusts the current to stabilize the output swing. The disclosed approach addresses the specific challenges of output swing variation in an efficient and compact manner, eliminating the need for additional pins and simplifying the PVT sensing process.

Figure 2:
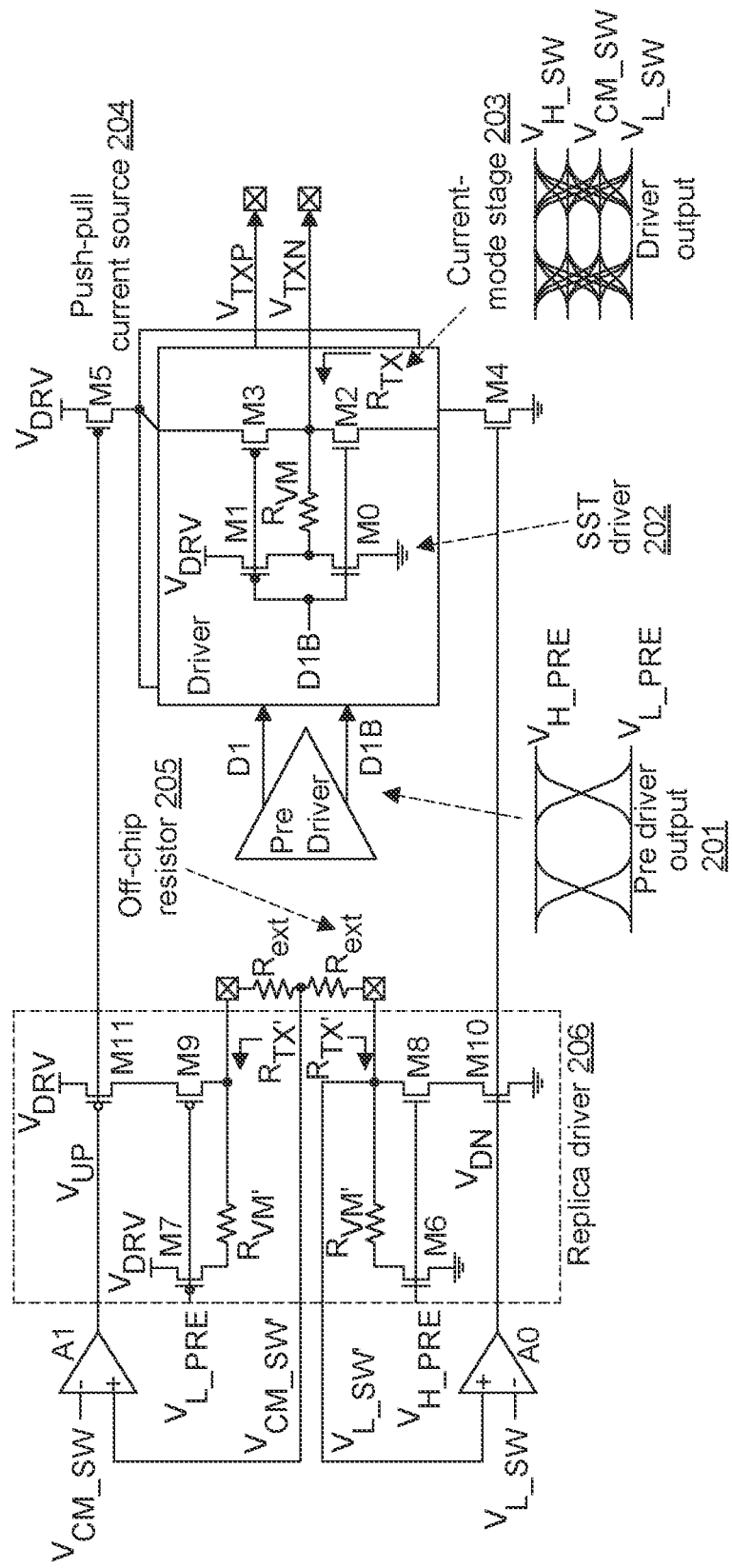
FIG. 2 illustrates a configuration of a hybrid driver with a constant output swing, according to an embodiment.

FIG. 2 illustrates a configuration of a hybrid driver with a constant output swing, according to an embodiment.

Referring to FIG. 2, a wireline transceiver system driver that processes data received from an upstream pre-driver 201 is shown. The input voltage swing to the driver is characterized by two levels: the highest input voltage level, referred to as $V_{H\_PRE}$, and the lowest input voltage level, denoted as $V_{L\_PRE}$. The SST driver 202 incorporates CMOS switches, specifically M0 and M1, and a series resistor labeled $R_{VM}$. Collectively, these components present a total input resistance characterized as $R_{TX}$.

Adjacent to the SST driver 202 is the current-mode stage 203, crafted with a high output resistance for effective signal transmission, comprising transistors M2 and M3. The output voltage swing is specified by the highest and lowest output voltage levels, $V_{H\_SW}$ and $V_{L\_SW}$, respectively, with a common-mode voltage level established as $V_{CM\_SW}$.

To account for $R_{TX}$ variations due to PVT influences, the system harnesses a push-pull current source 204, formed by transistors M4 and M5, to regulate the output swing. This regulation ensures stability across the PVT spectrum. The amount of current dispensed by the push-pull current source 204 is modulated by the bias voltages, $V_{UP}$ for upward adjustment and $V_{DN}$ for downward adjustment, thereby maintaining the predefined output voltage swing parameters and ensuring consistent transceiver performance.

According to an embodiment, an external off-chip termination resistor $R_{ext}$ 205 may be used to generate $V_{UP}$ and $V_{DN}$, along with a replica driver circuit 206 integrated with two feedback loops. In the replica driver 206, the resistors labeled $R_{ext}$ are off-chip and their values are stable, not subject to change under PVT conditions. This allows the replica driver 206 to reliably simulate the behavior of the SST driver's input resistance $R_{TX}$ under stable conditions, providing a consistent basis for feedback even as on-chip conditions change.

The replica driver 206 functions to mimic the differential hybrid SST driver's response to different PVT conditions. It uses the stable off-chip resistors to help generate the bias voltages $V_{UP}$ and $V_{DN}$. These bias voltages are then used to modulate the current in a push-pull current source, ensuring that the output voltage swing remains within the desired range of $V_{H\_SW}$ and $V_{L\_SW}$, despite any variations in PVT.

The pull-up and pull-down circuits within the replica driver produce outputs that correspond to the voltage levels $V_{TXP}$ and $V_{TXN}$. These mimic the driver's behavior when the pre-driver outputs a low signal (D1 low) and when the pre-driver outputs a high signal (D1B high), respectively. The outputs $V_{TXP}$ and $V_{TXN}$ are then used to adjust the currents through the push-pull current source transistors M4 and M5, which in turn control the output voltage swing of the main driver.

The operational amplifiers A0 and A1 in FIG. 2 are part of the feedback mechanism. A0 is responsible for adjusting the lower swing voltage level $V_{L\_SW'}$ in the replica driver 206 to match the target $V_{L\_SW}$ level in the main SST driver 202. A1 provides common-mode feedback, which is used to generate the bias voltage $V_{UP}$. Together, these mechanisms ensure that the driver maintains the desired output voltage swing across various operational conditions, thus preserving signal integrity and system performance.

When the system operates at the SS corner, for instance, the input resistance of the SST driver $R_{TX}$ increases. This change is mirrored in the replica driver 206, where the input resistance $R_{TX}$ also escalates, leading to a rise in the lower swing voltage level $V_{L\_SW'}$. Subsequently, this increase in $V_{L\_SW}$ results in a heightened $V_{DN}$, which in turn amplifies the current through transistor M10.

This augmentation of current adjusts $V_{L\_SW}$ downward, continuing until it aligns with the $V_{L\_SW}$ level as determined by the operational amplifier A0. Parallel to this, the operational amplifier A1 functions to provide common-mode feedback, which contributes to the generation of $V_{UP}$. These voltages, $V_{DN}$ and $V_{UP}$, are then introduced into the voltage bias inputs of the driver's push-pull current source, including transistors M4 and M5, thereby enhancing their current output.

Accordingly, the output voltage level of the driver is maintained between the higher swing voltage level $V_{H\_SW}$, and the lower swing voltage level $V_{L\_SW}$.

Figure 3:
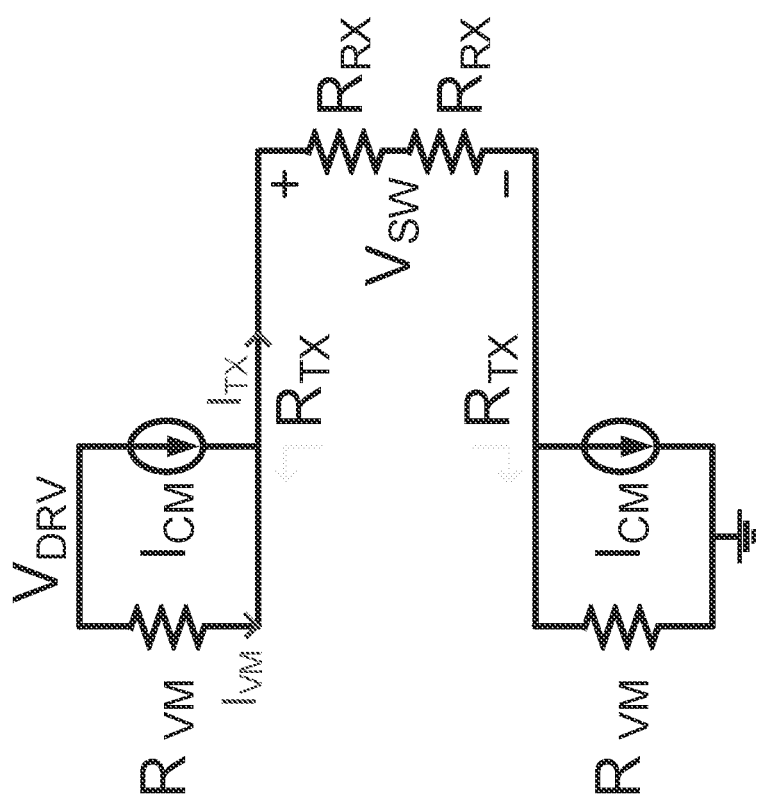
FIG. 3 illustrates a direct current (DC) model of a receiving driver of the wireline transceiver system, according to an embodiment.

FIG. 3 illustrates a DC model of an RX driver of the wireline transceiver system, according to an embodiment.

FIG. 3 is a representation of an SST driver's output stage that is simplified to illustrate the fundamental DC behavior of the circuit without the complexities of the actual alternating current (AC).

Referring to FIG. 3, a voltage source VDRV represents the driving voltage of the system. Resistors $R_{VM}$ represent a voltage drop across the driver's circuitry due to the modulation of the voltage by the SST driver components. $R_{TX}$ represents the total input resistance experienced by the driver in the circuit.

Adjacent to $R_{TX}$, there are two resistors labeled $R_{RX}$ connected to the positive (+) and negative (−) nodes of the output voltage, denoted as $V_{SW}$. These resistors symbolize the termination resistors at the receiving end of the transmission line, which are matched to the characteristic impedance of the line to ensure minimal signal reflection and optimal power transfer.

A mathematical framework for analyzing the DC model of the driver circuit within a wireline transceiver system is described below.

The total current through the transmitter $I_{TX}$ may be the sum of the voltage monitor current $I_{VM}$ and the common-mode current $I_{CM}$, as shown in Equation (1), below.

$$I_{VM} + I_{CM} = I_{TX} \qquad (1)$$

$I_{TX}$ may be defined based on the output swing voltage $V_{SW}$ and the termination resistance $R_{RX}$, according to Equation (2), below.

$$I_{TX} = \frac{V_{SW}}{2R_{RX}} \qquad (2)$$

$I_{VM}$ may be defined based on the driver voltage $V_{DRV}$, the output swing voltage $V_{SW}$, and the total input resistance $R_{TX}$, according to Equation (3), below.

$$I_{VM} = \frac{V_{DRV} - V_{SW}}{2R_{TX}} \qquad (3)$$

Equations (4)-(6), below, further deduce the relationships among the variables included in Equations (1)-(3), above, ultimately allowing for the determination of the output swing voltage $V_{SW}$ and the common-mode current $I_{CM}$ given the driving voltage $V_{DRV}$ and other circuit parameters.

$$\frac{V_{DRV} - V_{SW}}{2R_{TX}} + I_{CM} = \frac{V_{SW}}{2R_{RX}} \quad (4)$$

$$V_{SW} = \left(\frac{R_{RX}}{R_{TX} + R_{RX}}\right)V_{DRV} + 2\left(\frac{R_{TX}R_{RX}}{R_{TX} + R_{RX}}\right)I_{CM} \quad (5)$$

$$I_{CM} = \left(\frac{R_{TX} + R_{RX}}{2R_{TX}R_{RX}}\right)V_{SW} - \left(\frac{1}{2R_{TX}}\right)V_{DRV} \quad (6)$$

Figure 4:
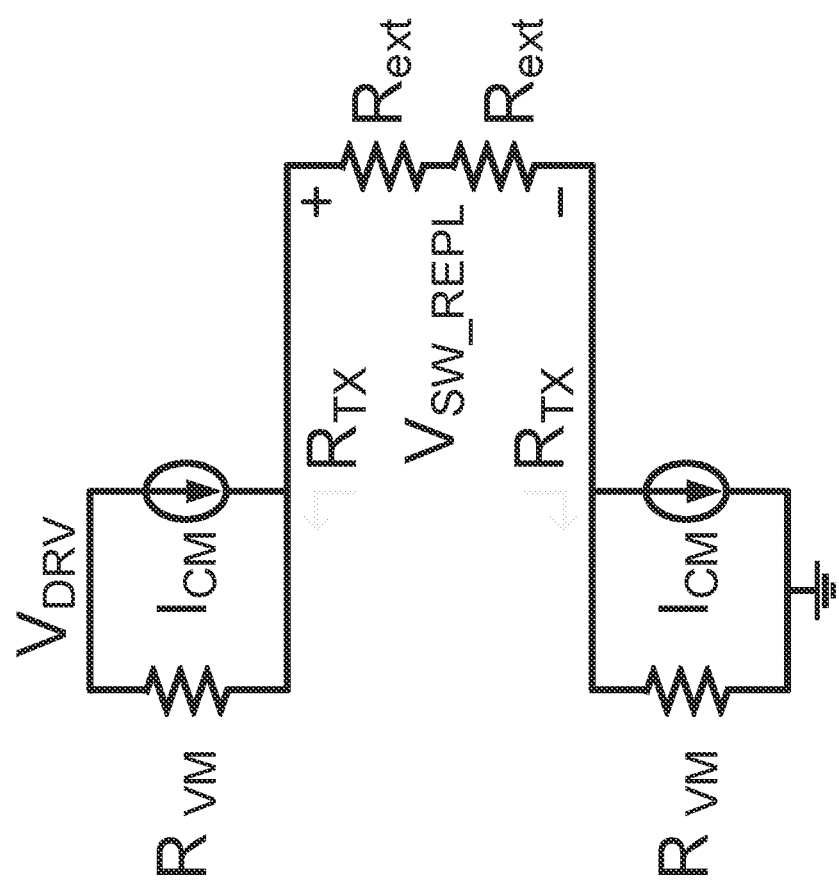
FIG. 4 illustrates a DC model of a replica driver's output stage of the wireline transceiver system, according to an embodiment.

FIG. 4 illustrates a DC model of a replica driver's output stage of the wireline transceiver system, according to an embodiment.

FIG. 4 is simplified to illustrate the fundamental DC behavior of the circuit without the complexities of the actual AC.

Referring to FIG. 4, the voltage source $V_{DRV}$ represents the driving voltage of the system. The resistors labeled $R_{VM}$ symbolize the voltage drop across the replica driver, while $R_{TX}$ signifies the input resistance of the replica driver.

When $R_{ext}$ is equal to the termination resistance $R_{RX}$, the current $I_{CM}$ required by the replica driver is derived similarly to that required by the main driver. This condition ensures that the replica driver accurately mimics the behavior of the main driver circuit.

Negative feedback mechanisms are employed to control the bounds of the output swing. Specifically, the NMOS bias voltage $V_{DN}$ is adjusted to control the lower swing bound $V_{LSW'}$ to match the desired value $V_{LSW}$. This is achieved by modulating $I_{CM}$ until the necessary lower swing bound is reached. Conversely, the PMOS bias voltage $V_{UP}$ is regulated to keep the common-mode output voltage $V_{CM\_SW'}$ at its desired value $V_{CM\_SW}$. As a result, the higher swing bound $VH_{SW'}$ is also adjusted as required.

Because the bias voltages $V_{UP}$ and $V_{DN}$ are connected to both the driver's current source (transistors M5/M4) and the replica's current source (transistors M11/M10), the current $I_{CM}$ in the driver should be the same as the replica, barring any local mismatches. This shared connection enables the system to replicate and adjust the driver's performance in the face of PVT variations.

Figure 5A:
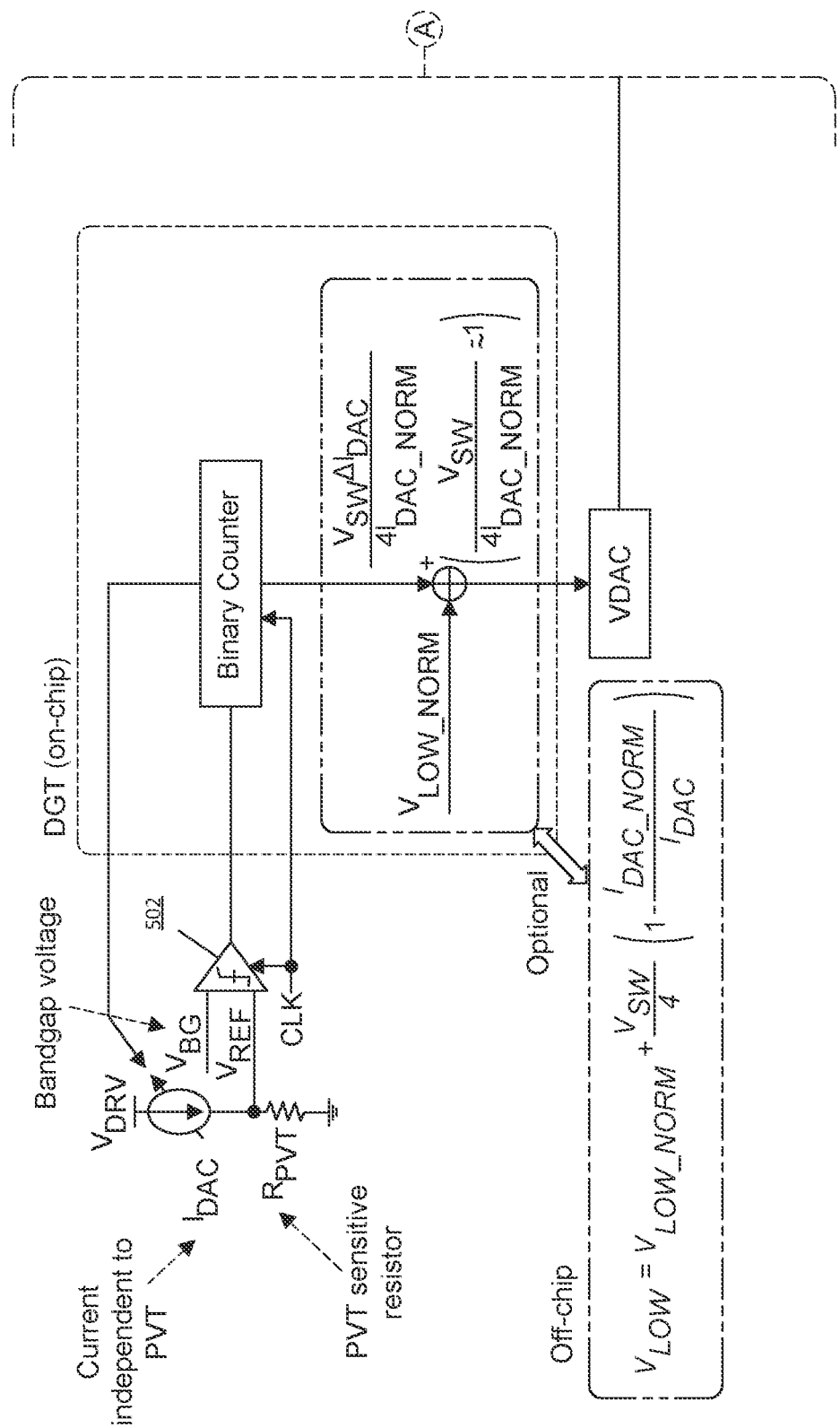
FIGS. 5A-5B illustrate a configuration of a hybrid driver with a constant output swing, according to an embodiment.
Figure 5B:
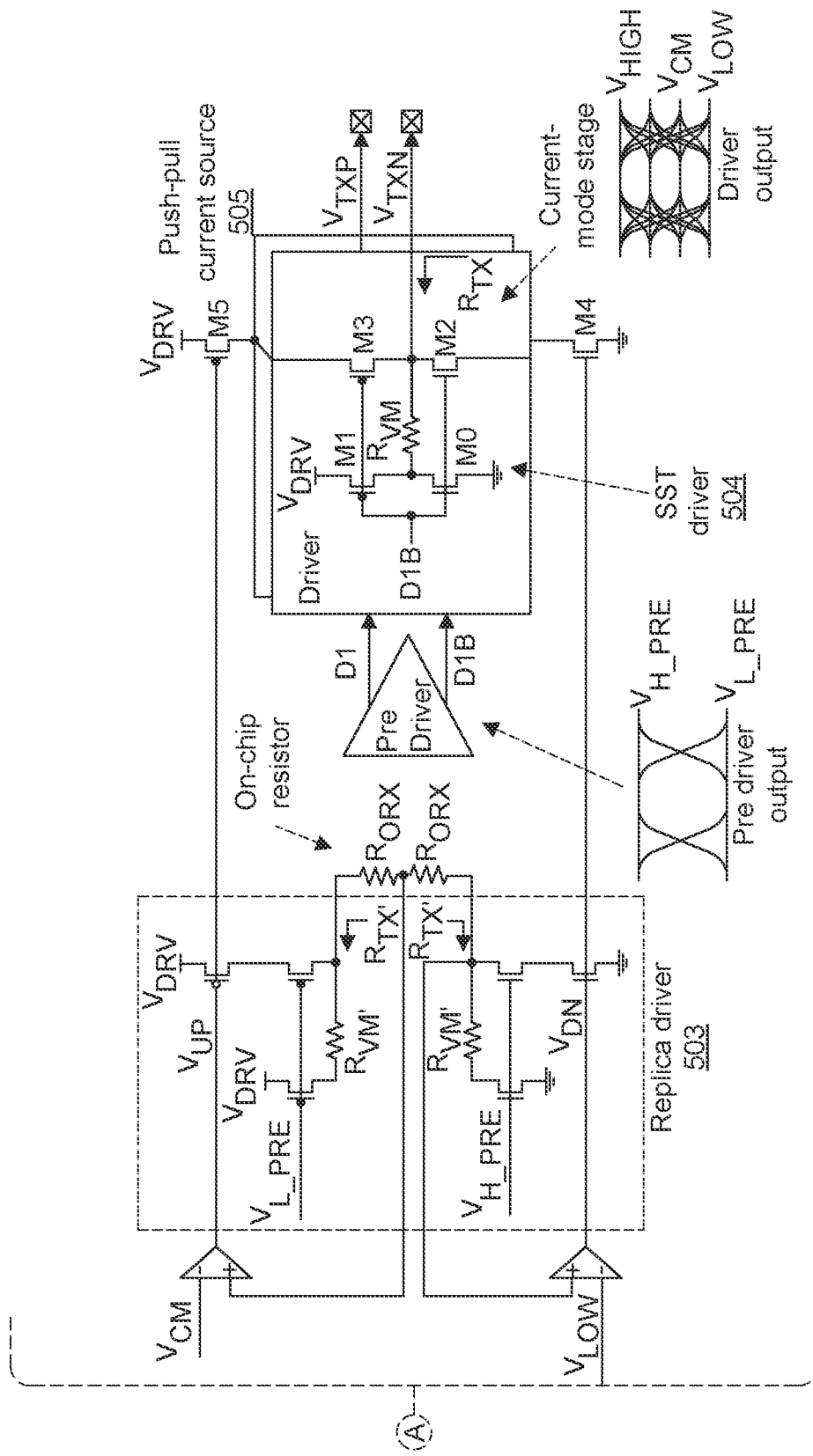

FIGS. 5A-5B illustrate a configuration of a hybrid driver with a constant output swing, according to an embodiment.

FIGS. 5A-5B represent a single block diagram and are merely separated on to separate pages so as to clearly show each of the features of the block diagram.

The embodiment of FIGS. 5A-5B differ from the embodiment of FIG. 2 because in FIGS. 5A-5B, each of the components may be positioned on the same chip by using on-chip resistors and digital calibration.

Referring to FIGS. 5A-5B, on-chip resistors $R_{ORX}$, are implemented to emulate the behavior of the RX termination resistors $R_{RX}$. Under typical conditions, the combined resistance of a pair of resistors $R_{RX}$ may be 100 Ohms. The resistors $R_{ORX}$ are sensitive to PVT variations, and their values may change in response to PVT fluctuations.

A PVT compensation mechanism featuring an internal PVT-sensitive resistor $R_{PVT}$ working with an on-chip current DAC $I_{DAC}$ is provided, which is immune to PVT changes. This combination generates a reference voltage $V_{REF}$ that may be compared with $V_{BG}$ using a comparator 502. The comparator's output may inform a binary counter to adjust the $I_{DAC}$'s current to align $V_{REF}$ with $V_{BG}$, ensuring a stable reference voltage. For example, the binary counter may be reset, and the number of 1's output from the comparator 502 may be counted, and $I_{DAC}$'s current may be increased until $V_{REF}$ is equal to $V_{BG}$.

The replica driver 503 is configured to adjust the bias voltages $V_{UP}$ and $V_{DN}$ based on the $V_{LOW}$ calculated by the $V_{DAC}$, following the binary counter's output. $V_{LOW}$ is dynamically adjusted using a normative value $V_{LOW\_NORM}$ and the standard $I_{DAC}$ measurement ($I_{DAC\_NORM}$) established at a typical operating corner, according to Equation (7), below.

$$V_{LOW} = V_{LOW\_NORM} + \frac{V_{SW}}{4}\left(1 - \frac{I_{DAC\_NORM}}{I_{DAC}}\right) \quad (7)$$

The main driver circuit 504 and associated current-mode stage includes a push-pull current source 505 directly influenced by the bias voltages $V_{UP}$ and $V_{DN}$. These voltages enable the circuit to modulate the current through the circuit's transistors, ensuring the output swing remains constant.

For example, at the SS corner, where the driver output resistance $R_{TX}$ increases and potentially reduces the output swing, the system compensates by utilizing the $R_{ORX}$'s PVT variations to modify $V_{REF}$. This triggers a decrease in $I_{DAC}$ current, leading to an adjustment in $V_{LOW}$, which causes VON to rise and $V_{UP}$ to fall. These changes collectively increase the current in the current-mode stage, bolstering the output swing back to the desired constant level.

Figure 6:
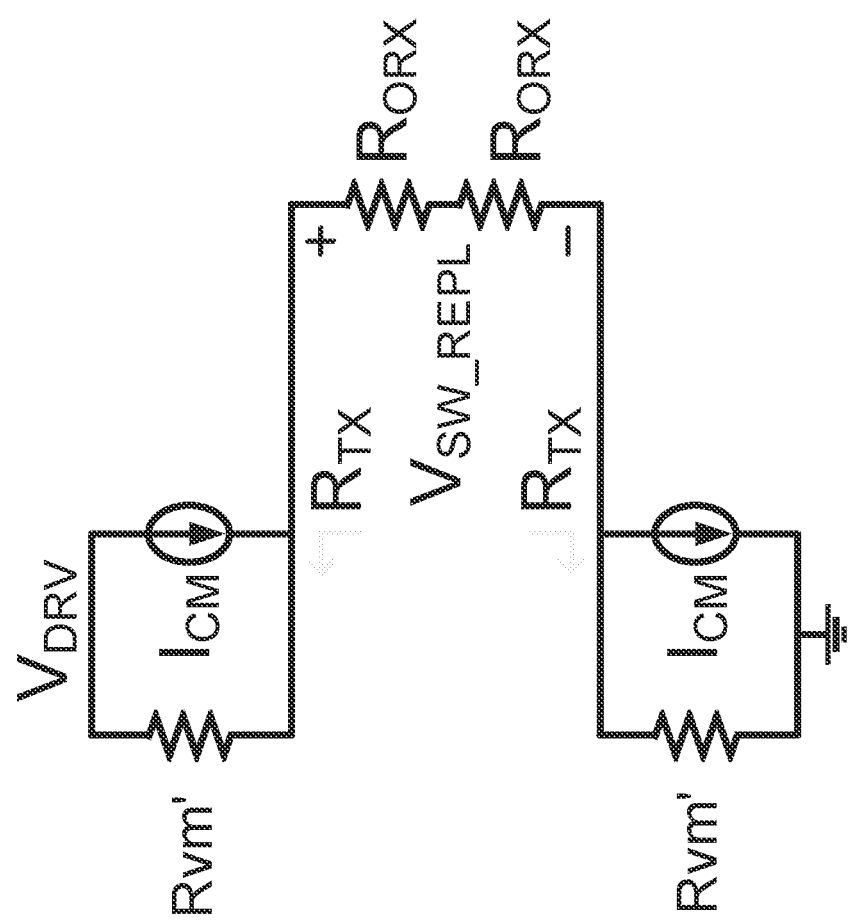
FIG. 6 illustrates a DC model of a replica driver of the wireline transceiver system, according to an embodiment.

FIG. 6 illustrates a DC model of a replica driver of the wireline transceiver system, according to an embodiment.

FIG. 6 is a representation of a replica driver's output stage that is simplified to illustrate the fundamental DC behavior of the circuit without the complexities of the AC.

Referring to FIG. 6, the DC model of the replica driver includes a voltage source $V_{DRV}$ which feeds into a circuit with a common-mode current source $I_{CM}$. The circuit includes on-chip resistors $R_{VM'}$ and $R_{TX'}$, arranged in a configuration to emulate the output swing of the driver. Notably, the on-chip resistor $R_{ORX}$ is designed to match the driver's input resistance $R_{TX}$, ensuring that $R_{ORX}$ equals $R_{TX}$ over $P_{VT}$ variations, with local mismatches being negligible for this model.

A method to derive the replica output swing $V_{SW\_REPL}$ based on known values of the driving voltage $V_{DRV}$ and the common-mode current $I_{CM}$ are provided below with respect to Equations (8)-(10).

$$V_{SW\_REPL} = \left(\frac{R_{TX}}{R_{TX} + R_{TX}}\right)V_{DRV} + 2\left(\frac{R_{TX}R_{TX}}{R_{TX} + R_{TX}}\right)I_{CM} \quad (8)$$

$$V_{SW\_REPL} = \left(\frac{V_{DRV}}{2}\right) + R_{TX}I_{CM} \quad (9)$$

$$V_{SW\_REPL} = \left(\frac{R_{TX} + R_{RX}}{2R_{RX}}\right)V_{SW} \quad (10)$$

Assuming that $R_{ORX}$ equals $R_{TX}$, the replica output swing may be calculated. Equation 8 expresses $V_{SW\_REPL}$ as a function of the driving voltage $V_{DRV}$ and the influence of the common-mode current $I_{CM}$ across the input resistance to determine the voltage swing at the replica driver. In Equation 9, $V_{SW\_REPL}$ may be expressed as being half the driving voltage $V_{DRV}$ plus the product of the input resistance $R_{TX}$ and the common-mode current $I_{CM}$.

Equation (10) further relates the replica output swing $V_{SW\_REPL}$ to the desired output swing $V_{SW}$ of the main (SST) driver, multiplied by the sum of $R_{TX}$ and $R_{RX}$ divided by (2*$R_{RX}$), which assumes a situation where $R_{ORX}$ equals $R_{TX}$.

Accordingly, the replica driver's output swing is computed and adjusted in tandem with the main driver to achieve a consistent output swing across PVT variations. Given that $I_{CM}$ is constant between the driver and the replica, Equations (8)-(10) facilitate real-time adjustments to the driver circuitry to compensate for PVT-induced variations, thus ensuring a stable transmission line output.

Figure 7:
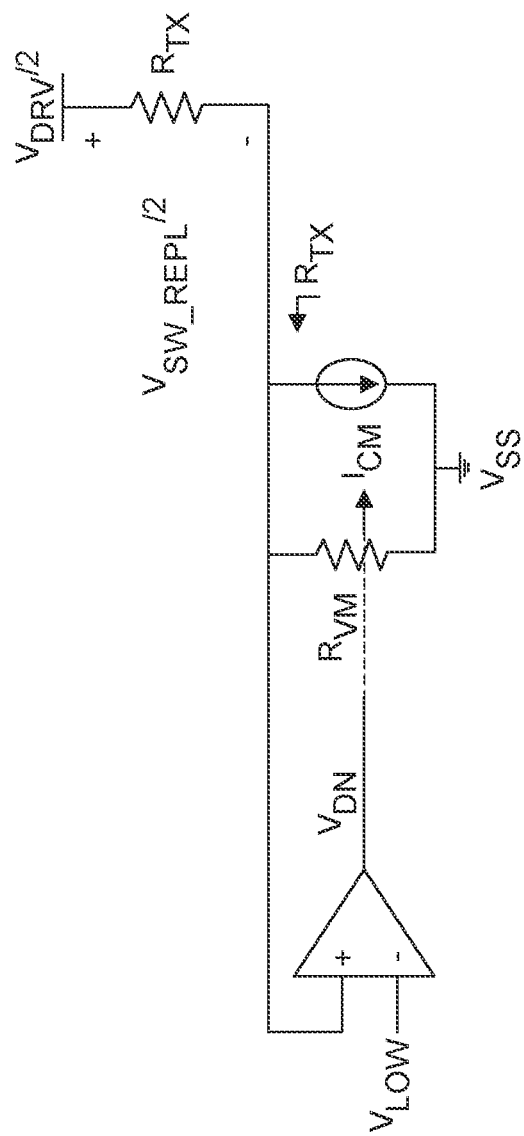
FIG. 7 illustrates a half-circuit DC model of a replica driver, including a feedback loop, of the wireline transceiver system, according to an embodiment.

FIG. 7 illustrates a half-circuit DC model of a replica driver, including a feedback loop, of the wireline transceiver system, according to an embodiment.

Referring to FIG. 7, the half-circuit model illustrates the feedback loop in operation, including a common-mode current source $I_{CM}$ that is connected to a resistor $R_{VM}$, which in turn is connected to the gate of a transistor controlled by the voltage $V_{DN}$. This feedback loop is responsible for setting the low output voltage level $V_{LOW}$ based on half a voltage level derived from the driving voltage $V_{DRV}$ and the replica output swing voltage $V_{SW\_REPL}$.

The $V_{LOW}$ value necessary for achieving the desired output swing voltage $V_{SW}$ is mathematically represented by Equations (11)-(12), below.

$$V_{LOW} = \frac{V_{DRV}}{2} - \frac{V_{SW\_REPL}}{2} \tag{11}$$

$$V_{LOW} = \frac{V_{DRV}}{2} - \left(\frac{R_{TX} + R_{RX}}{4R_{RX}}\right)V_{SW} \tag{12}$$

Equations (11)-(12) are derived by subtracting half of the replica output swing voltage $V_{SW\_REPL}$ from half of the driving voltage $V_{DRV}$, and reflect the proportional relationship between the desired $V_{LOW}$ and the sum of the driver's input resistance $R_{TX}$ and the termination resistance $R_{RX}$, divided by a factor (4) of the termination resistance $R_{RX}$.

Under nominal conditions, where $R_{TX}$ is defined to be equal to $R_{RX}$, the nominal low voltage level $V_{LOW\_NORM}$ is expressed by Equation (12) simplified to half of the driving voltage $V_{DRV}$ minus half of the output swing voltage $V_{SW}$.

As shown below, Equation (13) further refines the calculation of $V_{LOW}$ to account for variations in $R_{TX}$ relative to $R_{RX}$. This equation allows $V_{LOW}$ to adjust in response to changes in the ratio of $R_{TX}$ to $R_{RX}$, which should be sensed and compensated for to ensure consistent performance.

Figure 8:
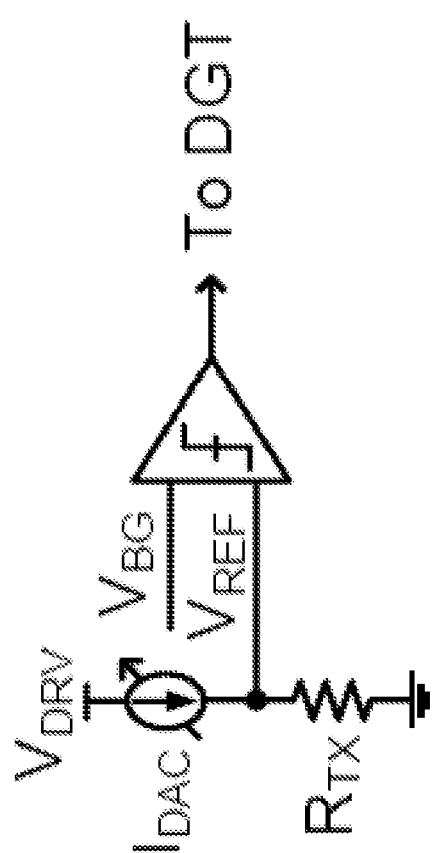
FIG. 8 illustrates a circuit model for sensing a ratio of a driver output resistance to a termination resistance, of the wireline transceiver system, according to an embodiment.

FIG. 8 illustrates a circuit model for sensing a ratio of a driver output resistance to a termination resistance, of the wireline transceiver system, according to an embodiment.

Referring to FIG. 8, the ratio of the driver output resistance $R_{TX}$ to the termination resistance $R_{RX}$ may be sensed through a bandgap reference voltage $V_{BG}$, a tunable current source $I_{DAC}$, and a replica resistance $R_{PVT}$.

The bandgap reference $V_{BG}$ provides a stable voltage reference against which variations in $I_{DAC}$ and $R_{PVT}$ can be measured. Under nominal conditions, the resistance $R_{PVT}$ is set to equal both $R_{TX}$ and $R_{RX}$, with $I_{DAC}$ adjusted to its nominal value $IDAC_{NORM}$. The $R_{PVT}$ and $R_{TX}$ may be designed to vary in tandem with PVT changes, maintaining the same proportion to one another.

Equations (13)-(14) are provided below, which show that, to keep $V_{REF}$ constant, the product of $R_{PVT}$ and $I_{DAC}$ should remain equal to the product of $R_{TX}$ and $I_{DAC}$.

$$V_{REF} = R_{PVT}I_{DAC} = R_{TX}I_{DAC} \tag{13}$$

$$V_{REF} = R_{RX}I_{DAC\_NORM} \tag{14}$$

As a result, the ratio of $R_{TX}$ to $R_{RX}$ can be determined by comparing the nominal $I_{DAC}$ value with the actual $I_{DAC}$ value, as shown below in Equation (15).

$$\frac{R_{TX}}{R_{RX}} = \frac{I_{DAC\_NORM}}{I_{DAC}} \tag{15}$$

Furthermore, by substituting the ratio in Equation (15) based on Equation (10), the required low output voltage level $V_{LOW}$ can be adjusted according to the sensed variation in $R_{TX}$ relative to $R_{RX}$. The required low output voltage level $V_{LOW}$ may be expressed according to Equation (16), below.

$$V_{LOW} = V_{LOW\_NORM} + \frac{V_{SW}}{4}\left(1 - \frac{I_{DAC\_NORM}}{I_{DAC}}\right) \tag{16}$$

As shown below, in Equation (17), the Taylor series may approximate $V_{LOW}$ by adding a term to $V_{LOW\_NORM}$ that accounts for the difference between the actual $I_{DAC}$ and $I_{DAC\_NORM}$, scaled by the output swing voltage $V_{SW}$ divided by $I_{DAC}$_NORM divided by 4.

$$V_{LOW} = V_{LOW\_NORM} + \frac{V_{SW}}{4I_{DAC\_NORM}}(I_{DAC} - I_{DAC\_NORM}) \tag{17}$$

Accordingly, the open-loop adjustment of $V_{LOW}$ may be determined by digitally controlling $V_{DAC}$, based on the sensed current difference ($I_{DAC}$-$I_{DAC\_NORM}$). By applying an appropriate digital gain to this difference, the system can dynamically compensate for changes in $R_{TX}$, ensuring that the output swing remains consistent across different operating conditions.

According to an embodiment, the bandgap reference voltage $V_{BG}$ may be set to a nominal value $V_{REF\_NORM}$ equal to the product of the termination resistance $R_{RX}$ and a nominal $I_{DAC}$ current $I_{DAC\_NORM}$. This setup ensures that under nominal conditions, $V_{REF}$ is equivalent to $V_{BG}$, establishing a stable reference point for the system.

$V_{REF}$ may be monitored for deviations from $V_{BG}$ using a feedback loop with a binary comparator and a digital counter. The comparator may assess whether $V_{REF}$ matches $V_{BG}$, and any discrepancy may be registered by the counter. Since $V_{BG}$ is unaffected to PVT, $V_{BG}$ may serve as a reliable benchmark for adjustment.

The feedback loop may operate by altering $I_{DAC}$, which in turn adjusts $V_{REF}$. As PVT conditions induce changes, the system dynamically modifies $I_{DAC}$ to realign $V_{REF}$ with the stable $V_{BG}$, effectively compensating for the variations.

Once $I_{DAC}$ settles to the appropriate value that equates $V_{REF}$ to $V_{BG}$, the output of the binary counter digitally signifies the difference between the actual $I_{DAC}$ current and the nominal $I_{DAC}$ current ($I_{DAC}$-$I_{DAC\_NORM}$). This digital representation can then be scaled using a predetermined digital gain (K), which, along with a digital voltage offset ($D_{VLOW\_NORM}$) and the voltage resolution of $V_{DAC}$, is used to generate the low output voltage ($V_{LOW}$) through a feedforward path.

Accordingly, the driver's output swing may be consistently maintained at the desired value, regardless of inherent PVT-induced changes. The digital manipulation of $I_{DAC}$, coupled with the precision of the feed-forward path, allows for a robust and precise control mechanism.

Figure 9:
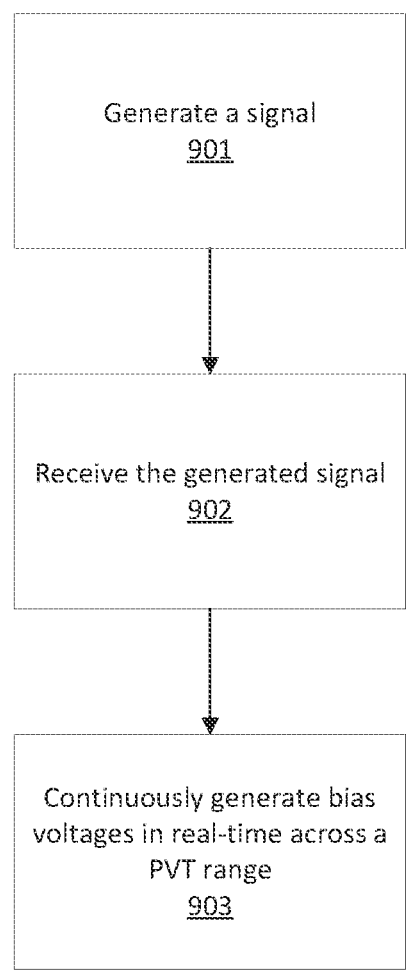
FIG. 9 is a flowchart illustrating a method for generating bias voltages to modulate current of a push-pull current source, according to an embodiment.

FIG. 9 is a flowchart illustrating a method for generating bias voltages to modulate current of a push-pull current source, according to an embodiment.

The steps illustrated in FIG. 9 may be performed by a wireline transceiver system (e.g., an electronic device) including one or more drivers. Moreover, one or more of the steps may be performed on-chip and/or one or more of the steps may be performed off-chip.

Referring to FIG. 9, in step 901 a predriver generates a signal. For example, the signal may correspond to the signal output 201 in FIG. 2.

In step 902, an SST driver receives the signal generated by the predriver. For example, the SST driver may correspond to the SST driver 202 in FIG. 2.

In step 903, bias voltages are continuously generated (or in other words, continuously updated) by a replica driver to modulate current of the push-pull current source of the SST driver. The bias voltages may be based on a voltage of the received signal across a PVT range. In addition, the replica driver may use preselected values of $V_{H\_SW}$, $V_{L\_SW}$, and $V_{CM\_SW}$ to obtain a bias voltage that appropriately compensates the received signal to obtain an output within a desired voltage swing range. For example, the replica driver may correspond to the replica driver 206 in FIG. 2.

Figure 10:
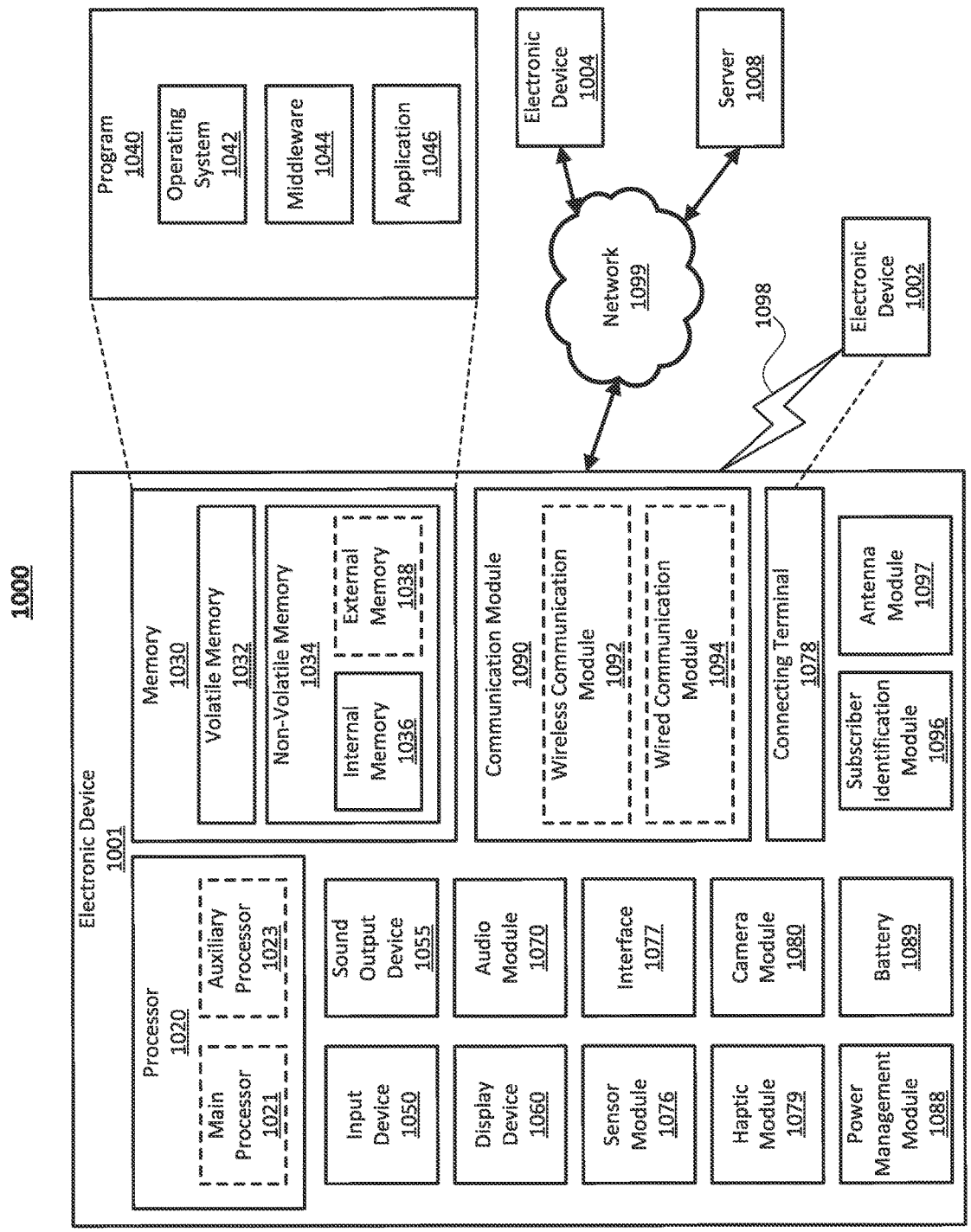
FIG. 10 is a block diagram of an electronic device in a network environment, according to an embodiment.

FIG. 10 illustrates an electronic device in a network environment, according to an embodiment.

Referring to FIG. 10, the electronic device 1001, e.g., a mobile terminal including GPS functionality, in the network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097 including a GNSS antenna. In one embodiment, at least one (e.g., the display device 1060 or the camera module 1080) of the components may be omitted from the electronic device 1001, or one or more other components may be added to the electronic device 1001. In one embodiment, some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor, and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to one embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to one embodiment, the audio module 1070 may obtain the sound via the input device 1050, or output the sound via the sound output device 1055 or a headphone of an external electronic device 1002 directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wiredly) or wirelessly. According to one embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. According to one embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. According to one embodiment, the haptic module 1079 may include, for example, a motor, a piezoelectric element, or an electrical stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. According to one embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor) and supports a direct (e.g., wired) communication or a wireless communication. According to one embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to one embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A wireline transceiver system comprising:
 a predriver configured to generate a signal;
 a source-series termination (SST) driver configured to receive the generated signal; and
 a replica driver configured to continuously generate bias voltages in real time to modulate current of a push-pull current source of the SST driver based on a voltage of the received signal across a process, voltage, and temperature (PVT) range.

2. The wireline transceiver system of claim 1, wherein the replica driver further comprises a plurality of negative feedback loops used to generate the bias voltages.

3. The wireline transceiver system of claim 1, further comprising:
 an external termination resistor used to generate the bias voltages.

4. The wireline transceiver system of claim 1, wherein an output voltage level of the SST driver is maintained in a predefined range.

5. The wireline transceiver system of claim 4, wherein the SST driver includes an SST stage having an input resistance, and
 wherein the push-pull current source is configured to provide a necessary amount of current to maintain the output voltage level in the predefined range in case that the input resistance varies across the PVT range.

6. The wireline transceiver system of claim 1, further comprising a first operational amplifier configured to control a positive bias voltage included in the bias voltages, and
 a second operational amplifier configured to control a negative bias voltage included in the bias voltages.

7. The wireline transceiver system of claim 1, wherein the bias voltages are generated based on a reference voltage calculated using an internal resistor and an adjustable current.

8. The wireline transceiver system of claim 7, further comprising a comparator configured to compare the reference voltage with a bandgap voltage,
 wherein the adjustable current is increased until the comparator indicates that the reference voltage is equal to the bandgap voltage.

9. The wireline transceiver system of claim 7, wherein the internal resistor is designed to mimic a termination resistor.

10. The wireline transceiver system of claim 1, wherein the bias voltages are adjusted based on a ratio of an input resistance to a termination resistance.

11. A method for generating bias voltages in a wireline transceiver system, comprising:
 generating a signal at a predriver;
 receiving the generated signal at a source-series termination (SST) driver; and
 continuously generating the bias voltages in real time at a replica driver to modulate current of a push-pull current source of the SST driver based on a voltage of the received signal across a process, voltage, and temperature (PVT) range.

12. The method of claim 11, wherein the replica driver further comprises a plurality of negative feedback loops used to generate the bias voltages.

13. The method of claim 11, wherein the bias voltages are generated using an external termination resistor.

14. The method of claim 11, wherein an output voltage level of the SST driver is maintained in a predefined range.

15. The method of claim 14, wherein the SST driver includes an SST stage having an input resistance, and
 wherein the push-pull current source is configured to provide a necessary amount of current to maintain the output voltage level in the predefined range in case that the input resistance varies across the PVT range.

16. The method of claim 11, further comprising a first operational amplifier configured to control a positive bias voltage included in the bias voltages, and
 a second operational amplifier configured to control a negative bias voltage included in the bias voltages.

17. The method of claim 11, wherein the bias voltages are generated based on a reference voltage calculated using an internal resistor and an adjustable current.

18. The method of claim 17, further comprising comparing the reference voltage with a bandgap voltage using a comparator;
 increasing the adjustable current; and stopping increasing the adjustable current when the comparator indicates that the reference voltage is equal to the bandgap voltage.

19. The method of claim 17, wherein the internal resistor is designed to mimic a termination resistor.

20. The method of claim 11, wherein the bias voltages are adjusted based on a ratio of an input resistance to a termination resistance.

* * * * *